Feb. 7, 1950     M. R. HUTCHISON, JR     2,496,943
SOUND FILM SCANNING APPARATUS WITH AUTOMATIC
LIGHT VARIATION COMPENSATION
Filed Oct. 19, 1946                            2 Sheets-Sheet 1

Miller R. Hutchison Jr.
INVENTOR

BY
ATTORNEYS

Patented Feb. 7, 1950

2,496,943

UNITED STATES PATENT OFFICE 2,496,943

SOUND FILM SCANNING APPARATUS WITH AUTOMATIC LIGHT VARIATION COMPENSATION

Miller R. Hutchison, Jr., Rochester, N. Y., assignor to Eastman Kodak Company, Rochester, N. Y., a corporation of New Jersey Application October 19, 1946, Serial No. 704,399

18 Claims. (Cl. 179—100.3)

The present invention relates to a motion picture film sound scanning apparatus. More specifically, it relates to a sound scanning system which compensates for the cyclic variations in filament brightness of an exciter lamp which are occasioned by the use of alternating current to energize the lamp.

In sound motion picture projectors means are provided to translate the light and dark areas of the sound track into electrical impulses to operate a loud speaker through an amplifier. Usually, this is accomplished by focusing a thin band or ribbon of light from an exciter lamp upon the sound track of a film moving at a uniform velocity. The opacity of the sound track determines the light flux which passes through the film and impinges upon the phototube which is positioned beyond the film. The electrical impulses of the phototube, so modulated by the sound track, control the audio amplifier and speaker. In such a system the exciter lamp must provide a considerable light output to overcome the operating inefficiencies of the optics, phototube, etc. and consequently requires a substantial supply of electrical energy. This is most readily available from the 60-cycle alternating current supply used to operate the projector, the amplifier, etc. Such energy, however, is unfortunately of a pulsating nature and, if used directly without rectification and filtration, causes cyclic variations of filament brightness of the exciter lamp. This pulsation of the light flux affects the phototube, usually quite strongly, with the result that the speaker hums, much as though it were connected directly to an alternating current power line. Since the current in the exciter lamp reaches maximum and minimum values twice during an alternating current cycle, the speaker hum has twice the line frequency. This hum is extremely objectionable to the listener.

There are several methods by which this hum may be reduced or eliminated. For example, the exciter lamp may be supplied by direct current from a battery. Since this is seldom convenient, alternating current may be rectified and filtered for the purpose but this means relatively bulky, expensive apparatus to supply the fairly heavy current requirements of the filament. An alternative is to employ a power oscillator operating at supersonic frequency, but this, on account of physical limitations affecting the "power pack" of the machine, requires the use of low-wattage exciter lamps in amateur equipment. Thus, heretofore there has been lacking an inexpensive, rugged and compact means to overcome the speaker hum in sound motion picture scanning apparatus caused by the use of alternating current to energize the exciter lamp.

It is, therefore, an object of the present invention to provide an improved sound motion picture scanning apparatus in which speaker hum, caused by the cyclic variations in filament brightness of the exciter lamp occasioned by the use of alternating current to energize the lamp, is eliminated or substantially reduced.

It is a further object of this invention to provide an improved film sound scanning device in which a reed is caused to vibrate in such manner as to partially occlude the light flux emitted by an exciter lamp and directed upon the sound track of the film, the vibrations of the reed being synchronized with the cyclic variations in filament brightness of the exciter lamp so that the light flux impinging upon the sound track remains substantially constant.

It is a still further object of this invention to provide an improved device of the character described in which various adjustments may be readily effected in regard to the amplitude and phase of reed displacement whereby the light flux impinging upon the sound track remains substantially constant despite the cyclic variations in filament brightness of the exciter lamp.

It is a still further object of this invention to so locate the reed within the housing for the sound optics that the housing remains substantially dust-proof and the reed is effectively damped in its oscillations.

It is a still further object of this invention to provide an improved sound motion picture scanning apparatus of the character herein described which is simple in construction, relatively inexpensive and fool-proof in operation.

Other objects and advantages of the invention will become apparent from the following description taken in connection with the accompanying drawings, and it will be understood that many changes may be made in the details of construction and arrangement of parts shown and described without departing from the spirit of the invention as expressed in the accompanying claims. I, therefore, do not wish to be limited to the exact details shown and described as the preferred form only has been shown by way of illustration.

Figure 3:
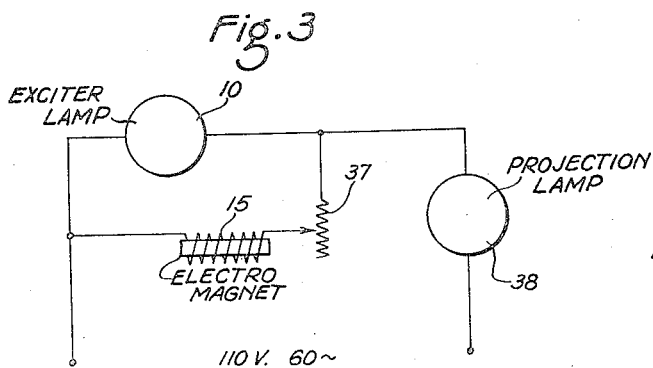

Figure 3 is a wiring diagram illustrating one way in which the elements of the film scanning apparatus may be connected into the projection lamp circuit; and Figures 4 to 7 are curves illustrating the theorectical considerations underlying the invention, showing various phase relationships between exciter lamp and electromagnetic coil voltages, coil current, magnetic flux, light flux and reed displacement.

Figure 1:
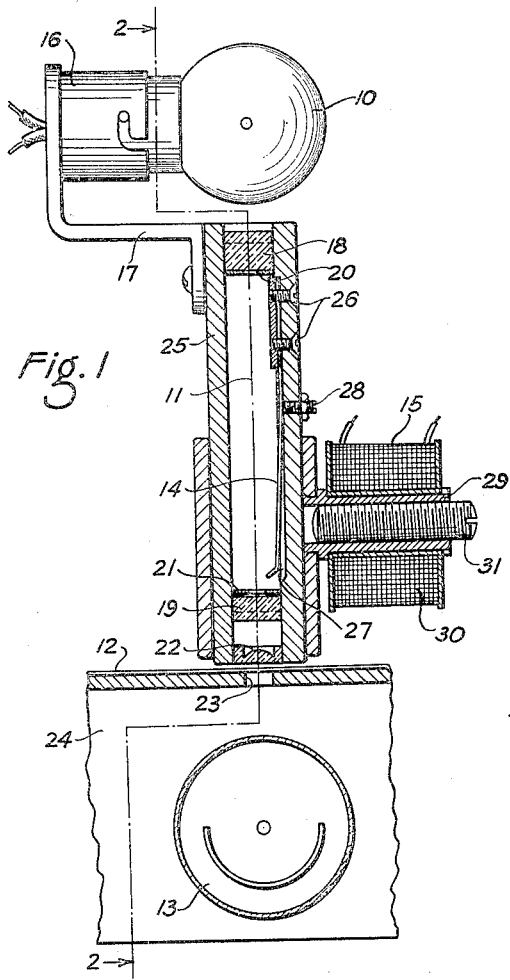
Figure 1 is a side view of a sound film scanning apparatus embodying the present invention taken partly in section along the line 1—1 of Figure 2.
Figure 2:
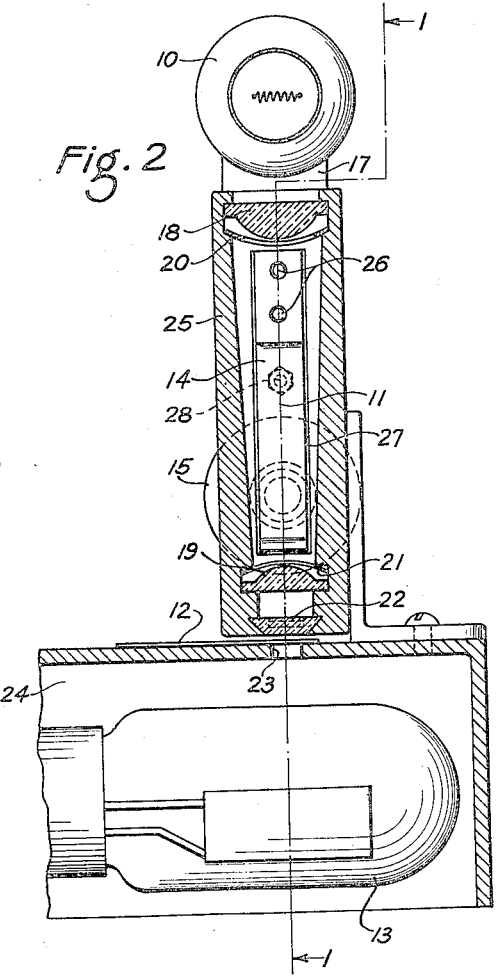
Figure 2 is an end view of the same embodiment taken in section along the line 2—2 of Figure 1.

The sound film scanning apparatus illustrated in Figures 1 and 2 comprises an exciter lamp 10 which is connected in series with the projection lamp 38, and an optical system 11 adapted for focusing a thin band of light upon the sound track of the film 12. The light flux in this thin band modified by its passage through the sound track impinges upon the phototube 13 resulting in the latter emitting electrical impulses, modulated by the sound track. These impulses in turn control the audio amplifier and speaker (not shown). To compensate for the cyclic variations in filament brightness of the lamp 10 which result from the use of alternating current, the sound film scanning device also includes a reed 14 which is caused to vibrate and to project partially into the light beam traversing the optical system 11 to intercept varying amounts of the light flux. The reed 14 is vibrated by the electromagnet 15, the amplitude and phase of reed displacement being so controlled that the reed mechanically valves the light flux as the filament brightness varies whereby the light flux impinging upon the sound track remains substantially constant.

The exciter lamp 10 is mounted in the lamp socket 16 which is secured by suitable bracket means 17 to the sound scanning apparatus in order that the lamp filament may be correctly positioned and properly aligned with relation to the optical system 11. The optical system 11 comprises two convergent lenses 18 and 19, preferably cylindrical, between which is interposed the reed 14, the vibrations of which cause it to intercept varying amounts of light flux, the reed thus functioning as an aperture stop. Additional fixed stops 20 and 21 are located adjacent the lenses 18 and 19, respectively. Beyond the lens 19 is positioned a third lens 22. This lens is cylindrical, its geometrical axis being parallel to the filament of the lamp 10 and at right angles to the axes of the cylindrical lenses 18 and 19. The lens 22 focuses that portion of the light flux, which has traversed the lenses 18 and 19 without being intercepted by the reed 14 as a narrow band of light upon the sound track of the film 12. An aperture 23 permits the band of light which has been modulated by its passage through the film sound track to enter the housing 24 for the phototube 13 where it impinges upon the cathode of the phototube.

The elements of the optical system 11 are mounted in a second housing 25 which serves to maintain the system substantially free of dust. The reed 14 is secured at one end in a recess 27 in an internal wall of the housing 25 by screws 26 or equivalent means. The recess 27 is so proportioned that it functions as means to air damp the reed. Vibration caused by moving parts on the sound projector will tend to drive the reed at its resonant frequency resulting in an objectionable ringing noise in the speaker during projection of the film. This microphonic condition is substantially reduced by the adequate damping of the reed.

It is not only unnecessary but even undesirable that the reed have a resonant frequency exactly equal to the frequency of the variations in filament brightness. It has been found that reeds having a natural frequency near 120 cycles, when operating on 60-cycle alternating current, are affected considerably as to phase and amplitude of motion by even slight changes in ambient temperature and line voltage. Reeds having natural frequencies somewhat larger or even somewhat less than twice the frequency of the alternating current employed in the apparatus are preferable. However, reeds having too high a natural frequency result in considerable microphonic disturbances, arising from vibrations caused by moving parts of the projector driving the reed at its resonant frequency, and reeds having too low a natural frequency tend to vibrate at the frequency of the alternating current instead of at twice that value, as desired.

The vibrating end of the reed 14, which is preferably made of spring steel, is turned sharply inward as noted in Figure 1 to suppress light reflections from its surface. A biasing screw 28 is also provided which is accessible from without the housing 25. This screw bearing against the spring reed is threaded into the wall of the housing 25 and determines the degree to which the reed projects into the light beam.

The electromagnet 15 is located wholly without the housing 25 and is positioned immediately adjacent the recessed wall in which the reed is mounted. The electromagnet comprises an internally threaded sleeve 29 which is mounted on the film scanning device in fixed position relative to the housing for the sound optics. Upon the sleeve 29 are the electromagnetic windings or coil 30 which is connected in parallel with the exciter lamp 10 whereby the same source of energy which energizes the lamp energizes the coil. A core 31 having a slotted end is threaded into the sleeve 29. The core is preferably formed of iron or some other material having a low magnetic remanence. The position of the core within the coil is longitudinally adjustable by merely inserting a screw driver into the slotted end of the core 31 and rotating the core clockwise or counter-clockwise to advance or retract the core to or from the reed 14. This altering of the magnetic air gap between the core and the reed affects the amplitude of reed vibration. As will be explained hereinafter, it is not only necessary to adjust the amplitude of reed vibration but the phase as well in order that the amount of light flux intercepted may be proportional to the filament brightness so that the light flux impinging upon the sound track may remain substantially constant. The phase relation may be varied by inserting resistance in series with the electromagnetic windings or coil. A variable resistance 37 is thus included in the coil circuit as may be noted in the wiring diagram of Figure 3. However, a change in the resistance will affect the reed amplitude as well as the phase relation and it is thus necessary to readjust the air gap to effect compensation after any change in the resistance.

Figures 4 to 7 are intended to explain the theory underlying the operation of the sound film scanning apparatus. The curves in these figures illustrate phase relationships of the various quantities involved; no relationship necessarily exists between the vertical scales to which these curves are drawn. For reference purposes for indicating relative phases of the various quantities, a complete cycle of alternating current will be considered as 360 degrees.

Figure 4:
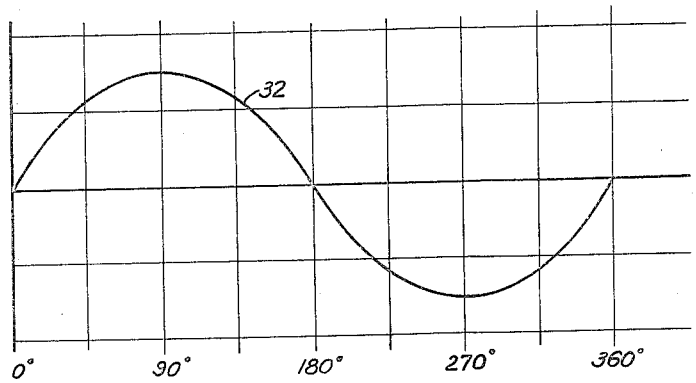
Figure 5:
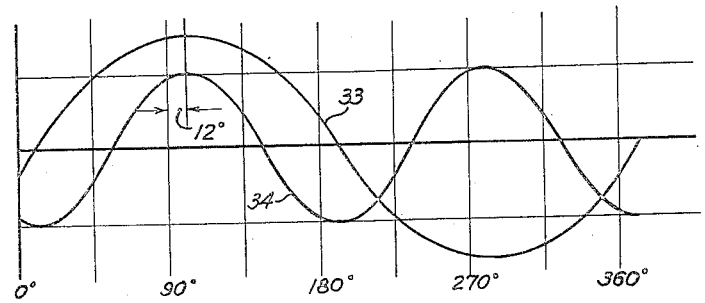
Figure 6:
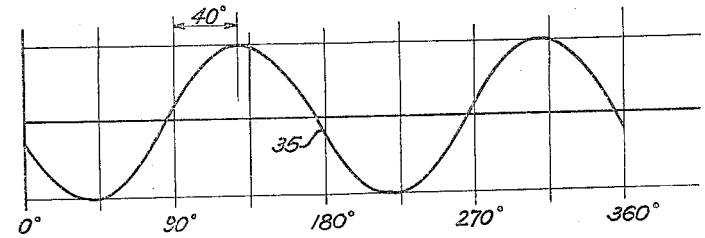
Figure 7:
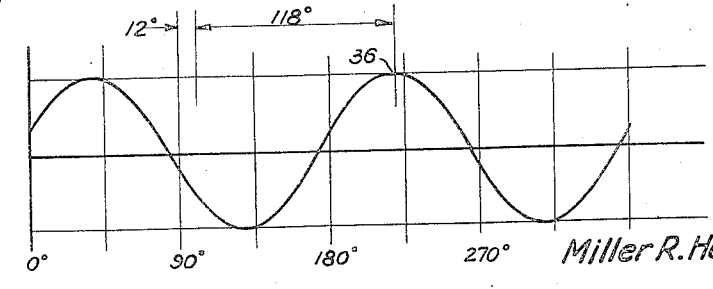

Assuming the absence of any resistance in series with the electromagnetic coil, the voltage impressed across the exciter lamp 10 will be the same as that across the coil 30. Curve 32 in Figure 4 represents both the lamp and coil voltages inasmuch as both the phase and frequency of these voltages will be identical. Depending upon the resistance and inductance of the coil windings 30 the current through the coil will lag the voltage by some definite amount. For the sake of illustration, assume this phase lag to be 12 degrees, the curve 33 of Figure 5 showing this specific lag. The magnetic flux which circulates through the windings of the coil will vary directly with the arithmetical value of the coil current and be substantially in phase therewith, the curve 34 indicating this particular relationship. Since the current flowing through the exciter lamp reaches maximum and minimum values twice during each complete alternating current cycle, a sine curve 35, representing light flux, will have twice the frequency as the curve 32 which represents lamp current as well as voltage. Moreover, it has been found that in the type of exciter lamp generally employed with a 60-cycle alternating current, the peaks of maximum light emission lag the lamp current and voltage by about 40 degrees, as noted in Figure 6.

To eliminate or substantially reduce the cyclic variations in light flux, it is necessary that the reed intercept a maximum of light flux when the filament brightness is at its maximum. Thus, the reed displacement from its initial position of projecting into the beam should be 180 degrees out of phase with the cyclic variations in the light flux emitted by the exciter lamp. Because, however, the curve representing light flux is drawn to the same phase scale as that representing lamp current and voltage and a complete cycle of light flux is, therefore, 180 degrees rather than 360 degrees, the 180-degree phase difference between the light flux and the reed displacement is actually 90 degrees on the scale to which the various curves of Figures 4 to 7 are plotted. Thus, as noted in Figures 6 and 7, curve 36 indicates the reed displacement as being 90 degrees out of phase with the light flux, indicated by curve 35. Since the reed displacement is substantially in phase with and directly proportional to the magnetic flux, it will be necessary to produce an additional lag in the coil current of 118 degrees in order that the magnetic flux may lag the lamp current by 130 degrees and the reed displacement may be 90 degrees out of phase with the peaks of maximum light emission of the lamp filament. The insertion of a resistance in series with the electromagnet will alter the phase of the magnetic flux and, therefore, the phase of the reed displacement. A variable resistance 37 is, therefore, included in series with the electromagnetic coil as shown in Figure 3. Thus, by adjusting the amplitude and phase of reed displacement by means of the biasing screw 28, the adjustable core 31 and the variable resistance 37 in series with the electromagnet, the reed can be made to vibrate in such a manner as to compensate for the variations in filament brightness of the exciter lamp resulting from the use of alternating current to energize the lamp.

It should be understood that the sound film scanning apparatus described herein is equally adaptable for use with films having sound tracks of either the variable density or the variable area types. It is also apparent that the beam of light falling upon the sound track need not be in the form of a thin band or ribbon of light. A beam of any cross section covering the width of the sound track would perform satisfactorily with a mask, or preferably a cylindrical lens and a mask, interposed between the film and the phototube to cause but a thin transverse band of light of the total beam scanning the sound strip to impinge upon the phototube. The present invention is obviously adapted to insure that a substantially uniform light flux impinge upon the sound track regardless of the cross section of the beam.

From the foregoing description, it will be apparent that I have provided means for obtaining all the objects and advantages of this invention.

What I claim and desire to secure by Letters Patent of the United States is:

1. In a sound film scanning apparatus adapted for use with alternating current, an exciter lamp, an optical system adapted to project a beam of light upon the sound track of the film, a phototube optically aligned with said lamp and optical system and positioned to receive light which has traversed the sound track, a reed capable of being vibrated and projected partially into the light beam, means to vibrate said reed in synchronism with the cyclic variations in lamp brightness caused by the use of alternating current, and means to adjust the phase of the reed vibrations relative to the variations in lamp brightness, whereby the light flux impinging upon the sound track remains substantially constant.

2. In a sound film scanning apparatus adapted for use with alternating current, an exciter lamp, an optical system including a cylindrical lens adapted to focus a thin band of light upon the sound track of the film, a housing for said optical system, an inner surface of said housing being provided with a channel, a phototube optically aligned with said lamp and optical system and positioned to receive that portion of the band of light which has traversed the sound track, a reed secured in said channel and having an end free to vibrate and to project partially into the light beam to intercept varying amounts of the light flux traversing said housing, said channel being adapted to air damp the vibrations of said reed, means to vibrate said reed in synchronism with the cyclic variations in lamp brightness, and means to adjust the phase of the reed vibrations relative to the variations in lamp brightness, whereby the light flux impinging upon the sound track remains substantially constant.

3. In a sound film scanning apparatus adapted for use with alternating current, an exciter lamp, an optical system adapted to project a beam of light upon the sound track of the film, a housing for said optical system, an inner surface of said housing being provided with a channel, a phototube optically aligned with said lamp and optical system and positioned to receive light which has traversed the soundtrack, a reed having a resonant frequency somewhat near but not equal to twice the frequency of the alternating current secured in said channel and having an end free to vibrate and to project partially into the light beam to intercept varying amounts of the light flux traversing said housing, said channel being adapted to air damp the vibrations of said reed, means to vibrate said reed in synchronism and in such phase relation with the cyclic variations in lamp brightness whereby the light flux impinging upon the sound track remains substantially constant.

4. In a sound film scanning apparatus adapted for use with alternating current, an exciter lamp, an optical system adapted to project a beam of light upon the sound track of the film, a phototube optically aligned with said lamp and optical system and positioned to receive light which has traversed the sound track, a reed positioned adjacent to the optical system capable of being vibrated and projected partially into the light beam, electromagnetic means adjacent to said reed and operating on the same source of alternating current which is used to energize the said exciter lamp, said electromagnetic means being adapted to vibrate said reed in synchronism and in such phase relation with the cyclic variations in lamp brightness, whereby the reed intercepts varying amounts of light flux so that the total light flux impinging upon the sound track remains substantially constant.

5. In a sound film scanning apparatus for use with alternating current, an exciter lamp, an optical system including a cylindrical lens adapted to focus a thin band of light upon the sound track of the film, a housing for said optical system, a phototube optically aligned with said lamp and optical system and positioned to receive that portion of the band of light which has traversed the sound track, a reed secured in said housing and having an end adapted to be vibrated and projected partially into the light beam to intercept varying amounts of the light flux traversing said housing, an electromagnet outside of the housing adjacent to said reed and operating on the same circuit of alternating current which is used to energize the exciter lamp, said electromagnet being thus adapted to vibrate the reed in synchronism with the cyclic variations in lamp brightness occasioned by the use of alternating current, and means to adjust the phase of the reed vibrations relative to the variations in lamp brightness, whereby the total light flux impinging upon the sound track remains substantially constant.

6. In a sound film scanning apparatus adapted for use with alternating current, an exciter lamp, an optical system adapted to project a beam of light upon the sound track of the film, a phototube optically aligned with said lamp and optical system and positioned to receive light which has traversed the sound track, a reed positioned adjacent to the optical system and having an end adapted to be vibrated and projected partially into the light beam to intercept varying amounts of the light flux traversing said optical system, an electromagnet connected in parallel with the exciter lamp, the electromagnet being positioned adjacent to said reed and adapted to vibrate the reed in synchronism with the cyclic variations in lamp brightness occasioned by the use of alternating current, whereby the total light flux impinging upon the sound track remains substantially constant.

7. In a sound film scanning apparatus for use with alternating current, an exciter lamp, an optical system adapted to project a beam of light upon the sound track of the film, a housing for said optical system, a phototube optically aligned with said lamp and optical system and positioned to receive light which has traversed the sound track, a channel in an inner surface of said housing, a reed secured in said channel and having an end free to vibrate and to project partially into the light beam to intercept varying amounts of light flux traversing said housing, an electromagnet outside of the housing operating from the same source of alternating current which energizes the exciter lamp and adapted to vibrate said reed, the said vibrations being synchronized with the cyclic variations in lamp brightness occasioned by the use of alternating current, and means to adjust the phase of the reed vibrations relative to the variations in lamp brightness, whereby the total light flux impinging upon the sound track remains substantially constant.

8. In a sound film scanning apparatus adapted for use with alternating current, an exciter lamp, an optical system adapted to project a beam of light upon the sound track of the film, a housing for said optical system, an inner surface of said housing having a channel recessed therein, a phototube optically aligned with said lamp and optical system and positioned to receive light which has traversed the sound track, a reed secured in said channel and having an end free to vibrate and to project partially into the light beam to intercept varying amounts of the light flux traversing said housing, an electromagnet outside of the housing connected in parallel with the exciter lamp and adapted to vibrate said reed, the said vibrations being synchronized with the cyclic variations in lamp brightness occasioned by the use of alternating current, and a variable resistance in series with the electromagnet for adjusting the phase of reed vibrations relative to the variations in lamp brightness, whereby the total light flux impinging upon the sound track remains substantially constant.

9. In a sound film scanning apparatus for use with alternating current, an exciter lamp, an optical system including a cylindrical lens adapted to focus a thin band of light upon the sound track of the film, a housing for said optical system, an inner surface of said housing being provided with a channel, a phototube optically aligned with said lamp and optical system and positioned to receive that portion of the band of light which has traversed the sound track, a reed having a resonant frequency somewhat near but not equal to twice the alternating current frequency secured in said channel and having an end free to vibrate and to project partially into the light beam to intercept varying amounts of the light flux traversing said housing, said channel being adapted to air damp the vibrations of said reed, an electromagnet outside of said housing operating on the same circuit of alternating current which is used to energize the exciter lamp and adapted to vibrate said reed in synchronism with the cyclic variations in lamp brightness whereby the total light flux impinging upon the sound track remains substantially constant.

10. In a sound film scanning apparatus adapted for use with alternating current, an exciter lamp, an optical system adapted to project a beam of light upon the sound track of the film, a phototube optically aligned with said lamp and optical system and positioned to receive light which has traversed the sound track, a reed positioned adjacent to the optical system and having an end adapted to be vibrated and projected partially into the light beam to intercept varying amounts of the light flux traversing said optical system, means for adjusting the position of the end of the reed relative to the light beam, an electromagnet for vibrating said reed operating on the same circuit of alternating current which is used to energize the exciter lamp, means for adjusting the amplitude of vibration of the reed and means for adjusting the phase of the fluctuations of the magnetic field, whereby the reed vibrates in such synchronism with the cyclic variations in lamp brightness resulting from the use of alternating current, that the total light flux impinging upon the sound track remains substantially constant.

11. In a sound film scanning apparatus adapted for use with alternating current, an exciter lamp, an optical system adapted to project a beam of light upon the sound track of the film, a phototube optically aligned with said lamp and optical system and positioned to receive light which has traversed the sound track, a reed positioned adjacent to the optical system and having an end adapted to be vibrated and projected partially into the light beam to intercept varying amounts of the light flux traversing said optical system, adjusting means for predetermining the position of the end of the reed relative to the light beam, an electromagnet adjacent to said reed and operating on the same circuit of alternating current which is used to energize the exciter lamp, the electromagnet having an adjustable core whereby the air gap between the reed and core may be adjusted to vary the amplitude of vibration, and means for adjusting the phase of the fluctuations of the magnetic field, whereby the reed will vibrate in correct synchronism with the cyclic variations in lamp brightness and the total light flux impinging upon the sound track will remain substantially constant.

12. In a sound film scanning apparatus for use with alternating current, an exciter lamp, an optical system adapted to project a beam of light upon the sound track of the film, a housing for said optical system, a phototube optically aligned with said lamp and optical system and positioned to receive light which has traversed the sound track, a reed secured in said housing and having an end adapted to be vibrated and projected partially into the light beam to intercept varying amounts of the light flux traversing said housing, means for adjusting the position of the end of the reed relative to the light beam, an electromagnet outside of the housing operating from the same source of alternating current which energizes the exciter lamp and adapted to vibrate said reed, means for adjusting the amplitude of vibration of the reed, and means for adjusting the phase of the fluctuations of the magnetic field of the electromagnet, whereby the reed may be caused to vibrate in such synchronism with the cyclic variations in lamp brightness resulting from the use of alternating current, that the total light flux impinging upon the sound track remains substantially constant.

13. In a sound film scanning apparatus for use with alternating current, an exciter lamp, an optical system adapted to project a beam of light upon the sound track of the film, a housing for said optical system, an inner surface of said housing having a channel, a phototube optically aligned with said lamp and optical system and positioned to receive light which has traversed the sound track, a reed secured in said channel and having an end free to vibrate and to project partially into the light beam to intercept varying amounts of the light flux traversing said housing, said channel being adapted to air damp the vibrations of said reed, means for adjusting the position of the end of the reed relative to the light beam, an electromagnet outside of the housing operating on the same circuit of alternating current which is used to energize the exciter lamp and adapted to vibrate said reed, means for adjusting the amplitude of vibration of the reed, and means for adjusting the phase of the fluctuations of the magnetic field of the electromagnet, whereby the reed may be caused to vibrate in synchronism with the cyclic variations in lamp brightness resulting from the use of alternating current, so that the total light flux impinging upon the sound track remains substantially constant.

14. In a sound film scanning apparatus for use with alternating current, an exciter lamp, an optical system including a cylindrical lens adapted to focus a thin band of light upon the sound track of the film, a housing for said optical system, an inner surface of said housing being provided with a channel, a phototube optically aligned with said lamp and optical system and positioned to receive that portion of the band of light which has traversed the sound track, a reed having a resonant frequency somewhat near but not equal to twice the alternating current frequency secured in said channel and having an end free to vibrate and to project partially into the light beam to intercept varying amounts of the light flux traversing said housing, said channel being adapted to air damp the vibrations of said reed, means for adjusting the position of the end of the reed relative to the light beam, an electromagnet outside of the housing operating on the same circuit of alternating current which is used to energize the exciter lamp and adapted to vibrate said reed, means for adjusting the amplitude of vibration of the reed, and means for adjusting the phase of the fluctuations of the magnetic field of the electromagnet, whereby the reed may be caused to vibrate in synchronism with the cyclic variations in lamp brightness so that the total light flux impinging upon the sound track remains substantially constant.

15. In a sound film scanning apparatus adapted for use with alternating current, an exciter lamp, an optical system adapted to project a beam of light upon the sound track of the film, a phototube optically aligned with said lamp and optical system and positioned to receive light which has traversed the sound track, a reed positioned adjacent to the optical system and having an end adapted to be vibrated and projected partially into the light beam to intercept varying amounts of the light flux traversing said optical system, screw means for adjusting the position of the end of the reed relative to the light beam, an electromagnet adjacent to said reed and connected in parallel with the exciter lamp, the electromagnet having an adjustable core whereby the air gap between the reed and core may be adjusted to vary the amplitude of reed vibration, and a variable resistance in series with the electromagnet for adjusting the phase of the fluctuations of the magnetic field, whereby the reed will vibrate in correct synchronism with the cyclic variations in lamp brightness and the total light flux impinging upon the sound track will remain substantially constant.

16. In a sound film scanning apparatus adapted for use with alternating current, an exciter lamp, an optical system adapted to project a beam of light upon the sound track of the film, a housing for said optical system, a phototube optically aligned with said lamp and optical system and positioned to receive light which has traversed the sound track, a reed secured in said housing and having an end adapted to be vibrated and projected partially into the light beam to intercept varying amounts of the light flux traversing said housing, screw means for adjusting the position of the end of the reed relative to the light beam, an electromagnet outside of said housing connected in parallel with the exciter lamp and adapted to vibrate said reed, the electromagnet having an adjustable core for varying the air gap between the reed and core to vary the amplitude of reed vibration, and a variable resistance in series with the electromagnet for adjusting the phase of the fluctuations of the magnetic field of the electromagnet, whereby the reed may be caused to vibrate in such synchronism with the cyclic variations in lamp brightness resulting from the use of alternating current, that the total light flux impinging upon the sound track remains substantially constant.

17. In a sound film scanning apparatus adapted for use with alternating current, an exciter lamp, an optical system adapted to project a beam of light upon the sound track of the film, a housing for said optical system, an inner surface of said housing being provided with a channel, a phototube optically aligned with said lamp and optical system and positioned to receive light which has traversed the sound track, a reed secured in said channel and having an end free to vibrate and to project partially into the light beam to intercept varying amounts of the light flux traversing said housing, said channel being adapted to air damp the vibrations of said reed, screw means for adjusting the position of the end of the reed relative to the light beam, an electromagnet outside of said housing connected in parallel with the exciter lamp and adapted to vibrate said reed, the electromagnet having an adjustable core for varying the air gap between the reed and core to vary the amplitude of reed vibration, and a variable resistance in series with the electromagnet, whereby the reed may be caused to vibrate in such synchronism with the cyclic variations in lamp brightness that the total light flux impinging upon the sound track remains substantially constant.

18. In a sound film scanning apparatus adapted for use with alternating current, an exciter lamp, an optical system including a cylindrical lens adapted to focus a thin band of light upon the sound track of the film, a housing for said optical system, an inner surface of said housing being provided with a channel, a phototube optically aligned with said lamp and optical system and positioned to receive that portion of the band of light which has traversed the sound track, a reed having a resonant frequency somewhat near but not equal to twice the alternating current frequency secured in said channel and having an end free to vibrate and to project partially into the light beam to intercept varying amounts of the light flux traversing said housing, said channel being adapted to air damp the vibrations of said reed, screw means for adjusting the position of the end of the reed relative to the light beam, an electromagnet outside of said housing connected in parallel with the exciter lamp and adapted to vibrate said reed, the electromagnet having an adjustable core for varying the air gap between the reed and core to vary the amplitude of reed vibration, and a variable resistance in series with the electromagnet, whereby the reed may be caused to vibrate in such synchronism with the cyclic variations in lamp brightness that the total light flux impinging upon the sound track remains substantially constant.

MILLER R. HUTCHISON, Jr.

REFERENCES CITED

The following references are of record in the file of this patent:

UNITED STATES PATENTS

| Number | Name | Date |
| --- | --- | --- |
| 2,036,447 | Tuttle | Apr. 7, 1936 |
| 2,208,937 | Schwarz | July 23, 1940 |
| 2,274,530 | Collins | Feb. 24, 1942 |
| 2,354,295 | Albin | July 25, 1944 |